United States Patent
Knight et al.

(10) Patent No.: US 10,371,059 B2
(45) Date of Patent: Aug. 6, 2019

(54) CABIN BLOWER SYSTEM

(71) Applicant: ROLLS-ROYCE plc, London (GB)

(72) Inventors: Glenn A Knight, Belper (GB); Alan R Maguire, Derby (GB); Daniel Robinson, Derby (GB)

(73) Assignee: ROLLS-ROYCE plc, London (GB)

( * ) Notice: Subject to any disclaimer, the term of this patent is extended or adjusted under 35 U.S.C. 154(b) by 556 days.

(21) Appl. No.: 14/957,972

(22) Filed: Dec. 3, 2015

(65) Prior Publication Data

US 2016/0167789 A1 Jun. 16, 2016

(30) Foreign Application Priority Data

Dec. 11, 2014 (GB) .................. 1422027.1
Apr. 15, 2015 (GB) .................. 1506396.9
Apr. 15, 2015 (GB) .................. 1506398.5

(51) Int. Cl.
| | |
|---|---|
| *B64D 13/02* | (2006.01) |
| *B64D 13/06* | (2006.01) |
| *B64D 31/14* | (2006.01) |
| *F02C 7/275* | (2006.01) |
| *F02C 7/277* | (2006.01) |
| *F16H 15/38* | (2006.01) |
| *F16H 37/08* | (2006.01) |

(52) U.S. Cl.
CPC ............ *F02C 7/277* (2013.01); *B64D 13/02* (2013.01); *B64D 31/14* (2013.01); *F02C 7/275* (2013.01); *F16H 37/086* (2013.01); *B64D 2013/0696* (2013.01); *F16H 2015/383* (2013.01); *F16H 2037/088* (2013.01)

(58) Field of Classification Search
CPC ............ B64D 31/14; B64D 2013/0696; B64D 13/02; F16H 37/086; F16H 2015/383; F16H 2037/088; F02C 7/277; F02C 7/275
USPC ................................................ 244/60, 53 A
See application file for complete search history.

(56) References Cited

U.S. PATENT DOCUMENTS

| | | | | |
|---|---|---|---|---|
| 3,596,467 A | * | 8/1971 | Avery ........................ | F02C 9/30 476/4 |
| 3,965,673 A | * | 6/1976 | Friedrich ............... | B64D 13/06 60/788 |
| 4,178,667 A | | 12/1979 | Stevens et al. | |

(Continued)

FOREIGN PATENT DOCUMENTS

| | | |
|---|---|---|
| EP | 0934878 A2 | 8/1999 |
| EP | 0 974 515 A2 | 1/2000 |

(Continued)

OTHER PUBLICATIONS

Oct. 3, 2016 Search Report issued in European Patent Application No. 16166360.

(Continued)

*Primary Examiner* — Christopher S Bobish
(74) *Attorney, Agent, or Firm* — Oliff PLC

(57) ABSTRACT

An aircraft cabin blower system comprising a transmission and a compressor is disclosed. The system has a forward configuration in which the compressor is drivable in use via the transmission. The transmission comprises a toroidal continuously variable transmission giving selectively variable control over the rate at which the compressor is driven.

13 Claims, 10 Drawing Sheets

(56) References Cited

U.S. PATENT DOCUMENTS

| | | | |
|---|---|---|---|
| 4,514,976 A * | 5/1985 | Christoff | B64D 13/06 60/39.15 |
| 4,738,416 A | 4/1988 | Birbragher | |
| 5,125,806 A | 6/1992 | Quick et al. | |
| 5,136,837 A | 8/1992 | Davison | |
| 5,143,329 A | 9/1992 | Coffinberry | |
| 6,128,896 A | 10/2000 | Saiz | |
| 8,011,904 B2 | 9/2011 | Maguire et al. | |
| 8,181,442 B2 * | 5/2012 | Youssef | F02C 3/113 60/226.1 |
| 8,257,217 B2 | 9/2012 | Hoffman | |
| 8,397,487 B2 | 3/2013 | Sennoun et al. | |
| 8,500,583 B2 * | 8/2013 | Goi | F02C 7/275 475/5 |
| 8,844,296 B2 * | 9/2014 | Barkowsky | B64D 13/06 60/778 |
| 9,796,477 B2 * | 10/2017 | Hipsky | F02K 3/00 |
| 2012/0031501 A1 | 2/2012 | Tuan | |
| 2012/0325978 A1 | 12/2012 | Jain | |
| 2013/0266419 A1 | 10/2013 | Richardson et al. | |
| 2014/0000279 A1 | 1/2014 | Brousseau et al. | |
| 2015/0275769 A1 | 10/2015 | Foutch et al. | |

FOREIGN PATENT DOCUMENTS

| | | |
|---|---|---|
| EP | 1 143 167 A2 | 10/2001 |
| EP | 1 388 687 A2 | 2/2004 |
| EP | 1 777 156 A2 | 4/2007 |
| EP | 1 826 460 A1 | 8/2007 |
| EP | 1998029 A2 | 12/2008 |
| EP | 2022947 A2 | 2/2009 |
| EP | 2 333 282 A2 | 6/2011 |
| EP | 2 591 999 A2 | 5/2013 |
| EP | 2 625 102 A1 | 8/2013 |
| EP | 2644496 A1 | 10/2013 |
| EP | 2 829 706 A1 | 1/2015 |
| EP | 2 871 349 A1 | 5/2015 |
| EP | 3 034 405 A1 | 6/2016 |
| GB | 620 533 A | 3/1949 |
| WO | 95/02120 A1 | 1/1995 |
| WO | 2012/045864 A1 | 4/2012 |

OTHER PUBLICATIONS

May 23, 2016 Extended Search Report issued in European Patent Application No. 15197063.9.
Nov. 12, 2015 Search Report issued in British Patent Application No. 1508545.9.
U.S. Appl. No. 15/136,409, filed Apr. 22, 2016 in the name of Knight et al.
Jul. 13, 2016 Search Report issued in British Patent Application No. 1602710.4.
Goi et al., "Development of Traction Drive IDG(T-IDC®)," pp. 1-5.
Jun. 9, 2015 British Search Report issued in British Patent Application No. 1422027.1.
Oct. 8, 2015 British Search Report issued in British Patent Application No. 1506396.9.
Sep. 24, 2015 British Search Report issued in British Patent Application No. 1506398.5.
Jul. 21, 2016 Search Report issued in British Patent Application No. 1600180.2.
U.S. Appl. No. 15/372,289, filed Dec. 7, 2016 in the name of Knight et al.
May 30, 2017 Search Report issued in European Patent Application No. 16202557.
Goi et al., "Development of Traction Drive IDG(T-IDC®);" Proceedings of International Congress on Continuously Variable and Hybrid Transmissions; Sep. 2007; pp. 1-5.
Apr. 16, 2019 Office Action issued in U.S. Appl. No. 15/372,289.

* cited by examiner

CABIN BLOWER SYSTEM

The present disclosure concerns systems used on aircraft and aircraft themselves. More specifically the invention concerns an aircraft cabin blower system and methods of use of aircraft cabin blower systems.

Cabin blower systems are used to pressurise the cabins of aircraft. Cabin blowers are typically driven by one or more associated gas turbine engines of the aircraft. The gas turbine engine may be used to drive a cabin blower compressor in a number of ways (e.g. using electrical power generated by the engine, hydraulically or mechanically). Where mechanical driving of the compressor is employed, drive is typically taken from a shaft of the gas turbine engine via an ancillary gearbox. A means of adjusting the drive delivered to the compressor is also required; it is not desirable for the cabin air flow and pressure to be determined by the particular operating point of the gas turbine at any particular moment. Therefore a gearing mechanism such as a continuously variable transmission is also provided in the drive path between the ancillary gearbox and compressor. This system ensures that regardless of engine operating point and ambient air pressure the cabin flow and pressure can be maintained within acceptable limits.

By powering the compressor of the cabin blower via the ancillary gearbox, one of the ancillary gearbox mount pads is occupied. Typically other ancillary gearbox mount pads might for example be occupied by one or two electrical generators, one or two hydraulic pumps and an air starter. Each component has a weight and space penalty and places a demand for a drive pad on the ancillary gearbox.

According to a first aspect of the invention there is provided an aircraft cabin blower system comprising optionally a transmission and optionally a compressor, the system optionally having a forward configuration in which the compressor is drivable in use via the transmission, the transmission optionally comprising a toroidal continuously variable transmission optionally giving selectively variable control over the rate at which the compressor is driven.

Provision of the toroidal continuously variable transmission for use in controlling a cabin blower compressor may offer a relatively high degree of precision in controlling the drive to the compressor and therefore the pressure and/or quantity and/or rate of delivery of air delivered by the compressor for use in aircraft environmental control. The transmission may also facilitate enhanced cabin blower system functionality as discussed further below.

In some embodiments the system further comprises a gas turbine engine.

In some embodiments, in use, drive for the system operating in the forward configuration is generated by the gas turbine engine and delivered to the transmission via one or more shafts of the gas turbine engine. As will be appreciated an ancillary gearbox of the gas turbine engine may be provided in a transmission path intermediate the shaft or shafts of the gas turbine engine and the transmission. In using the gas turbine engine to power the system when running in the forward configuration, the provision of an alternative power source for the cabin blower system may not be necessary.

In some embodiments, in use of the system operating in the forward configuration, the compressor pumps air taken from a bypass duct of the gas turbine engine. A scoop may for example be provided adjacent a wall of the bypass duct and a conduit provided for delivering air from the scoop to the compressor. A further conduit may also be provided for delivering air from the compressor to one or more cabin air conditioning outlets. Air drawn from the bypass duct may be relatively free of gases and fumes that may be present elsewhere in the gas turbine engine.

In some embodiments the toroidal continuously variable transmission comprises at least one traction drive through which in use drive is transmitted, the traction drive comprising first and second toroids, the first toroid being attached to a first transmission shaft and the second toroid being attached to a second transmission shaft, the first and second toroids each having one of a pair of opposed toroidal surfaces and there being a set of rotatable variators disposed between the opposed toriodal surfaces.

In some embodiments, in the forward configuration of the system, the first and second toroids are separated and are drivingly engaged via a wheel of each variator, each wheel running in use on both of the opposed toroidal surfaces. By rotating the variators so as to vary the diameter of the respective toroidal surfaces at which the wheels engage, the gearing between the toroids may be adjustable. Consequently the relative rate at which one toroid is driven by and with respect to the other is adjustable. As will be appreciated the toroids will rotate in opposite directions, drive having passed via the wheel of each variator. As will be appreciated a traction fluid may be provided between the wheels and the toroidal surfaces, thus the wheels and toroidal surfaces may not make direct contact, but are nonetheless drivingly engaged.

In some embodiments the system is arranged so as it is operable in a reverse configuration, in use a supply of pressurised gas being supplied to the compressor, the compressor acting as a turbine and driving the one or more shafts of the gas turbine engine via the transmission. In this manner the cabin blower system may be provided with a second functionality as an engine starter, potentially eliminating need for a separate cabin blower and starter. This may reduce the required number of ancillary gearbox mount pads.

In some embodiments, in the reverse configuration, the variators are orientated so that the wheel of each variator engages only one or none of the opposed toroidal surfaces and the toroids are positioned to create a driving engagement via direct engagement between an engagement surface of each toroid. As will be appreciated direct engagement as used here is not intended to preclude the possibility of a traction fluid or similar being provided between the engagement surfaces.

By rotating the variators beyond providing a driving engagement between the toroids and so as not to obstruct the bringing together of the toroids (the variators may for example be smaller in one dimension than another), the drive direction through the transmission may be reversed. Specifically where the toroids are brought into direct driving engagement they will rotate in the same direction, whereas when driven through the variators they will rotate in opposite directions. This may be advantageous because where the compressor is acting as a turbine with the system in the reverse configuration, it may rotate in the opposite direction to the direction of rotation when the compressor is pumping cabin air with the system in the forward configuration. Specifically where gas is blown through the compressor in the opposite direction to the passage of air when the compressor is pumping cabin air, the compressor, acting as a turbine, may be driven to rotate in the opposite direction. Despite this, regardless of whether the system is operating in the forward or reverse configuration, the shaft or shafts of the gas turbine engine will need to rotate in the same direction. The potential to reverse the drive direction through the transmission may therefore mitigate the reversal of the compressor rotation direction between the forward and reverse configurations of the system.

In some embodiments an array of variable exit guide vanes is provided adjacent the compressor in the same flow path, the array being provided downstream of the compressor in the sense of a gas flow flowing through the flow path when the system is operated in the forward configuration. The variable exit guide vanes may enhance stable operation of the compressor over a desired flow rate range when the system is operated in the forward configuration. Furthermore the variable exit guide vanes may also be beneficial to condition the gas entering the compressor when it is serving as a turbine in the system's reverse configuration. Specifically by tuning the gas flow, the variable exit guide vanes may increase efficiency and/or pressure ratio delivered by the compressor when operating as a turbine. Further still the variable exit guide vanes may be arranged such that they are capable of directing gas driving the compressor such that it rotates in the same direction regardless of whether it is serving as a compressor (forward configuration) or as a turbine (reverse configuration). In this case it is not necessary to reverse the drive direction through the transmission nor consequently to remove the variators from the transmission path in order that the gas turbine engine shaft or shafts are rotated in the correct direction. Consequently actuation of the variators may be used to gear the drive delivered to the shaft or shaft of the gas turbine engine by the compressor acting as a turbine when the system is running in the reverse configuration.

In some embodiments the traction drive comprises a toroid end load delivery system arranged to selectively move the first and second toroids towards each other and/or increase the force engaging them and move the first and second toroids away from each other and/or decrease the force engaging them. As will be appreciated the end load delivery system may provide end load necessary to engage the toroids (via the wheels in the forward configuration and via the engagement surfaces in the reverse configuration). Similarly the end load delivery system may facilitate adjustment of the variators between their orientations for the forward and reverse configurations by separating the toroids to a degree sufficient to provide clearance for the adjustment. Specifically the end load delivery system may have sufficient travel such that that the toroids can be disengaged from the wheels by the end load delivery system when the variators are orientated for the forward configuration operation of the system. The end load delivery system may also provide a clutch functionality, allowing selective alteration of the degree of engagement between the toroids.

In some embodiments the system comprises two or more traction drives. The first and second transmission shafts of each traction drive may be the same first and second transmission shafts. It may be that considerable end loads are applied to the toroids in order to transmit torque. By using two traction drives it may be that there is no resultant force on supporting structures i.e. the system is balanced.

In some embodiments the transmission further comprises a bypass drive transmission parallel to the toroidal continuously variable transmission, the bypass drive transmission comprising a bypass transmission shaft. The toroidal continuously variable transmission may be a relatively inefficient way of delivering all drive. Thus if a direct bypass drive transmission is also provided, the toroidal continuously variable transmission may be principally used to vary the output of the direct drive. In this way the transmission efficiency may be increased.

In some embodiments the system is arranged to combine drive delivered from the toroidal continuously variable transmission and the bypass drive transmission when the system is operated in the forward configuration. In this way, despite the parallel nature of the transmission, a single drive source may be provided for the compressor.

In some embodiments the system is arranged to split drive delivered to the transmission between the toroidal continuously variable transmission and the bypass drive transmission when the system is operated in the reverse configuration. This may facilitate the use of the parallel transmissions where the system is operating in the reverse configuration and the compressor, serving as a turbine, delivers a single drive source.

In some embodiments the second transmission shaft of the toroidal continuously variable transmission has a first gear of the transmission provided in the transmission path between the second toroid and the compressor and the bypass transmission shaft has a second gear of the transmission.

In some embodiments the first gear of the transmission is, or is engaged with, a gear of a gearbox and the second gear of the transmission is another, or is engaged with another gear of the gearbox.

In some embodiments the gearbox is a differential planetary gearbox.

In some embodiments the first gear of the transmission is a sun gear of the gearbox, the second gear of the transmission is engaged with a ring gear of the gearbox and a planet carrier of the gearbox is engaged with the compressor.

In some embodiments the first transmission shaft of the toroidal continuously variable transmission is engaged with a first shaft of the gas turbine engine and the bypass transmission shaft of the bypass drive transmission is engaged with a second shaft of the gas turbine engine. Engagement between the respective gas turbine engine shafts and their corresponding transmission shafts may be achieved via respective, intermediate shafts provided therebetween. The intermediate shafts may be coaxial and may rotate in a common direction (thereby potentially reducing windage losses). As will be appreciated a pair of gears may be provided where each intermediate shaft engages its respective gas turbine engine shaft, one gear on the intermediate shaft and one on the gas turbine engine shaft. Similarly a pair of gears may be provided where each intermediate shaft engages its respective transmission shaft, one gear on the intermediate shaft and one on the transmission shaft. In this embodiment, two shafts of the gas turbine engine may be rotated by the system when it is operated in the reverse configuration to start the engine. With two shafts and potentially therefore two compressors being rotated during the start procedure, both acting to pump air rather than one acting as a restriction, start may be quicker and more efficient, potentially allowing use of lower powered starters.

In some embodiments the first transmission shaft is engaged with a higher pressure shaft of the gas turbine engine and the bypass transmission shaft is engaged with a lower pressure shaft of the gas turbine engine. The first transmission shaft may for example be engaged with a high pressure shaft of the gas turbine engine while the bypass drive transmission may be engaged with an intermediate or low pressure shaft. The first transmission shaft may alternatively be engaged with a lower pressure shaft, for example an intermediate or low pressure shaft of the gas turbine engine, while the first bypass drive transmission may be engaged with a high pressure shaft.

In some embodiments the toroidal continuously variable transmission and the bypass drive transmission are engaged with a common shaft of the gas turbine engine. In this way the transmission path between the shaft of the gas turbine engine and the transmission may be less complicated and lighter.

In some embodiments the system is arranged to split drive delivered to the transmission between the toroidal continuously variable transmission and the bypass drive transmission when the system is operated in the forward configuration. In this way drive delivered by a single shaft of the gas turbine engine can be used to power the parallel parts of the transmission.

In some embodiments there may be two or more compressors coupled to the transmission. Each compressor may therefore be smaller than a single compressor and may fulfil the cabin air blower requirements as an ensemble.

In some embodiments there may be two substantially identical systems, each operated independently. Each system may be driven by a shaft of the gas turbine engine. For example one of the systems may be driven by a high pressure shaft of the gas turbine engine and the other of the systems may be driven by a low pressure or intermediate pressure shaft. Each system may include one or more compressors which supply approximately half the cabin air requirement. Thus the two compressors or sets of compressors are each approximately half the size of a single compressor.

In some embodiments the compressors may be sized so that one compressor or set of compressors may supply the normal cabin air requirement. The second compressor or compressors, driven by the second system, may be idle during normal cabin air requirements. The second compressor may be phased in to meet higher cabin air requirements or when the first system is unable to meet the full requirement, for example in an aircraft descent mode of operation where the fan bypass air pressure may be much lower and extra pressure ratio and volume flow rate may be required to support the aircraft requirements.

In some embodiments there may be a clutch arrangement to disengage the second system from the compressor and/or the shaft of the gas turbine engine. The toroidal continuously variable transmission in the second system may be the clutch arrangement. By rotating its variators out of driving engagement with the first and second toroids and not moving the first and second toroids into direct driving engagement the toroidal continuously variable transmission acts to disengage the transmission path. Alternatively a separate clutch may be provided between the transmission and the compressor or between the shaft of the gas turbine engine and the transmission.

In some embodiments there may be three substantially identical systems, each operated independently. Each system may be driven by a shaft of a three-shaft gas turbine engine. For example one of the systems may be driven by a high pressure shaft of the gas turbine engine, another of the systems may be driven by an intermediate pressure shaft and the other of the systems may be driven by a low pressure shaft. Each system may include one or more compressors which supply approximately one third of the cabin air requirement. Thus the three compressors or sets of compressors are each approximately one third of the size of a single compressor.

In some embodiments the compressors may be sized so that one or two compressors or sets of compressors may supply the normal cabin air requirement. The second compressor or compressors, or second and third compressors or sets of compressors, may be idle during normal cabin air requirements but phased in as required. Three systems offer more flexibility to supply only sufficient cabin air.

In some embodiments having more than one compressor, the compressors may be unequally sized. Thus a compressor driven from the high pressure shaft of the gas turbine engine may be larger than a compressor driven from the low or intermediate pressure shafts.

In some embodiments the system is arranged to combine drive delivered from the toroidal continuously variable transmission and the bypass drive transmission when the system is operated in the reverse configuration. In this way drive delivered via the parallel parts of the transmission can be used to drive a single shaft of the gas turbine engine.

In some embodiments the first transmission shaft of the toroidal continuously variable transmission has a third gear of the transmission provided in a transmission path between the common gas turbine engine shaft and the first toroid and the bypass transmission shaft has a fourth gear of the transmission.

In some embodiments a common gear engages both the third and fourth gears of the transmission, the common gear being provided in a drive path between the third and fourth gears of the transmission and the common shaft of the gas turbine engine.

In some embodiments the system further comprises a clutch arrangement between the transmission and the compressor.

In some embodiments the clutch arrangement comprises a first gear train; the first gear train including a first drive transfer gear, a compressor gear and a first clutch; the first gear train arranged to transfer drive from the transmission to the compressor when the system is operated in the forward configuration.

In some embodiments the clutch arrangement comprises a second gear train; the second gear train including a second drive transfer gear, a third drive transfer gear and a second clutch; the second gear train arranged to transfer drive from the compressor to the transmission when the system is operated in the reverse configuration.

In some embodiments the first clutch and second clutch act in opposition to direct drive through only one of the first gear train and second gear train.

In some embodiments the first clutch is an over-running clutch. In some embodiments the second clutch is an over-running clutch.

In some embodiments the second gear train further includes the first drive transfer gear and the compressor gear from the first gear train. The first clutch disengages the direct coupling of the first drive transfer gear and the compressor gear while the second clutch engages the second gear train.

In some embodiments the second gear train further includes an idler gear engaged between the third drive transfer gear and the compressor gear. The idler gear reverses the directions of rotation through the remainder of the second gear train so that the first drive transfer gear is rotated in the same sense in both forward and reverse configurations.

In some embodiments the transmission comprises a second toroidal continuously variable transmission, the first and second toroidal continuously variable transmissions forming parallel transmission paths.

In some embodiments there is a second gearbox coupled to the compressor and to each toroidal continuously variable transmission.

In some embodiments the second gearbox is a differential planetary gearbox.

In some embodiments the planet carrier of the first differential planetary gearbox is engaged with a sun gear of the second gearbox, the planet carrier of the second differential planetary gearbox is engaged with a planet carrier of the second gearbox and a ring gear of the second gearbox is coupled to the compressor. The ring gear may be coupled to the compressor via the clutch arrangement.

In some embodiments, when the system is operated in reverse configuration, the system is arranged to split drive delivered to the transmission between the first and second toroidal continuously variable transmissions.

In some embodiments, when the system is operated in the forward configuration, both of the first and second toroidal continuously variable transmissions are arranged to drive the compressor and each of the first and second toroidal continuously variable transmissions is driven separately.

In some embodiments, when the system is operated in a forward configuration, drive is delivered to the first toroidal continuously variable transmission from a first shaft of the gas turbine engine and drive is delivered to the second toroidal continuously variable transmission from a second shaft of the gas turbine engine.

In some embodiments the system is arranged so as to be operable in a windmill re-light configuration wherein the first continuously variable transmission is driven by a shaft of a gas turbine engine; and wherein the second continuously variable transmission is driven by the first continuously variable transmission and drives another shaft of the gas turbine engine.

In some embodiments a brake is provided between the transmission and the compressor, the brake operable to prevent rotation of the compressor and/or part of the second gearbox. In some embodiments a clutch is provided between the transmission and the compressor, the clutch operable to disengage drive to the compressor. In some embodiments the clutch is provided by the clutch arrangement.

In some embodiments the planet carrier of the first differential planetary gearbox is engaged with a sun gear of the second gearbox, the planet carrier of the second differential planetary gearbox is engaged with a planet carrier of the second gearbox and a ring gear of the second gearbox is stationary. The second gearbox is therefore used for transferring power from one differential planetary gearbox to the other. The second gearbox may not be used to transfer power to or from the compressor in this arrangement. Instead each differential planetary gearbox may be coupled to its own compressor or set of compressors. One or both of the differential planetary gearboxes may be coupled to its own compressor or set of compressors via the clutch arrangement.

In some embodiments a second bypass drive transmission is provided parallel to the second continuously variable transmission, the second bypass drive transmission comprising a second bypass transmission shaft.

According to a second aspect of the invention there is provided a method of operating an aircraft cabin blower system, the system comprising optionally a gas turbine engine, optionally a transmission and optionally a compressor, the system optionally having a forward configuration in which the compressor is drivable in use via the transmission and optionally a reverse configuration in which in use a supply of pressurised gas is optionally supplied to the compressor and the compressor acts as a turbine, optionally driving one or more shafts of the gas turbine engine via the transmission, the transmission optionally comprising a toroidal continuously variable transmission optionally giving selectively variable control over the rate at which the compressor is driven in the forward configuration and optionally comprising at least one traction drive through which in use drive is transmitted, the traction drive optionally comprising first and second toroids and optionally a toroid end load delivery system arranged to selectively move the first and second toroids towards each other and/or increase the force engaging them and where further, in the reverse configuration of the system, the first and second toroids are optionally positioned to create a driving engagement optionally via direct engagement between an engagement surface of each first and second toroid, the method comprising:

optionally spooling up the compressor with the supply of pressurised gas so as it acts as a turbine optionally while the engagement surfaces of the first and second toroids are disengaged;

optionally when the compressor has reached a predetermined rotation rate, optionally adjusting the end load delivery system to force engagement of the engagement surfaces.

As will be appreciated the method described above may be used during the start procedure of the gas turbine engine. During performance of the method, the end load delivery system and engagement surfaces of the first and second toroid are behave as a clutch. When the toroids are engaged the inertia of the already turning transmission and compressor will cause an initial impulse to the shaft or shafts increasing the torque delivered by comparison with a situation where the engagement surfaces are engaged as the pressurised gas is first provided. A degree of slip may occur upon initial engagement of the engagement surfaces, but this may be desirable in order to better preserve aero performance of the spinning compressor.

In some embodiments the end load delivery system is also arranged to selectively move the first and second toroids away from each other and/or decrease the force engaging them and the method further comprises using the end load delivery system to disengage the engagement surfaces when the shaft or shafts have reached a predetermined rotation rate using the end load delivery system. In this way the driving of the shaft or shafts by the compressor may be discontinued. This may for instance be appropriate shortly before or during engine light-up. The method may also comprise discontinuing the supply of pressurised gas to the compressor.

According to a third aspect of the invention there is provided a method of operating an aircraft cabin blower system of an aircraft, the system optionally comprising a gas turbine engine, optionally a transmission and optionally a compressor, the system optionally having a forward configuration in which the compressor is drivable in use via the transmission and optionally a reverse configuration in which in use a supply of pressurised gas is supplied to the compressor and the compressor acts as a turbine, optionally driving one or more shafts of the gas turbine engine via the transmission, the transmission optionally comprising a toroidal continuously variable transmission giving selectively variable control over the rate at which the compressor is driven in the forward configuration, the method comprising:

optionally in flight of the aircraft, optionally using air pressurised by another gas turbine engine of the aircraft or cabin air as the supply of pressurised gas to the compressor and optionally operating the cabin blower system in the reverse configuration to turn the shaft or shafts of the gas turbine engine optionally as part of an engine re-light procedure.

As will be appreciated the system may lend itself to use of cabin air in particular as the source of pressurised air. Where for example ducting is provided to supply air from the compressor to the cabin when the system is operated in the forward configuration, the same ducting may be used to supply cabin air to the compressor when the system is operated in the reverse configuration.

According to a fourth aspect of the invention there is provided a method of operating an aircraft cabin blower system of an aircraft, the system optionally comprising a gas turbine engine, optionally a transmission and optionally a compressor, the system optionally having a forward configuration in which the compressor is drivable in use via the transmission, the transmission optionally comprising a toroidal continuously variable transmission giving selectively variable control over the rate at which the compressor is driven in the forward configuration and optionally comprising at least one traction drive through which in use drive is transmitted, the traction drive optionally comprising first and second toroids, the first and second toroids optionally each having one of a pair of opposed toroidal surfaces and there optionally being a set of rotatable variators disposed between the opposed toriodal surfaces, and where further, in the forward configuration of the system, the first and second toroids are optionally separated and are drivingly engaged via a wheel of each variator, each wheel optionally running in use on both of the opposed toroidal surfaces and where further the traction drive further optionally comprises a toroid end load delivery system optionally arranged to selectively move the first and second toroids away from each other, optionally disengaging the wheels from the opposed toroidal surfaces, the method comprising:

optionally in flight of the aircraft optionally disengaging the wheels from the opposed toroidal surfaces of the gas turbine engine in a shut-down state prior to an attempted windmill re-light procedure.

As will be appreciated, disengaging the wheels will disengage the compressor and part of the transmission from the shaft or shafts of the gas turbine engine, therefore decreasing the load on the shaft or shafts so as they may be driven at a higher windmill rate by air entering the gas turbine engine.

As will be appreciated the methods of the second to fourth aspects may be performed using systems having any of the additional features of embodiments of the first aspect.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
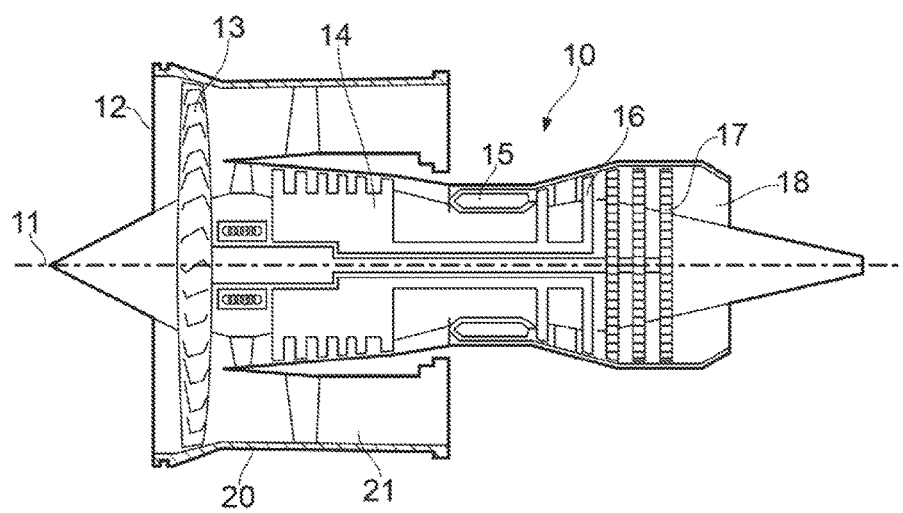
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

Figure 2:
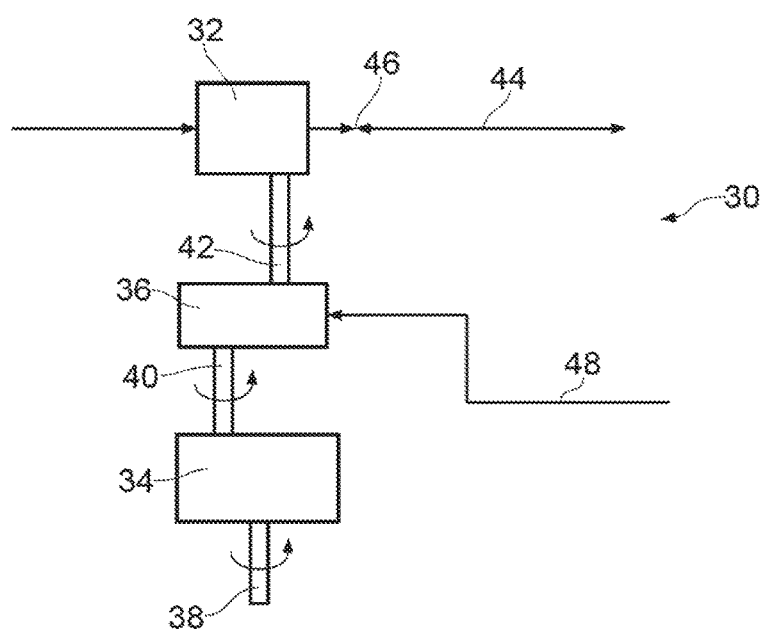
FIG. 2 is a schematic depiction of an aircraft cabin blower system in accordance with an embodiment of the invention.

Referring now to FIG. 2 an aircraft cabin blower system is generally provided at 30. As will be appreciated the blower system may incorporate a gas turbine engine (for instance as described with respect to FIG. 1).

The cabin blower system 30 has a shaft of a gas turbine engine (not shown) and a compressor 32 connected in a driving relationship. In the drive path intermediate the gas turbine engine shaft and compressor 32 are an accessory gearbox 34 of the gas turbine engine and a transmission 36. The shaft of the gas turbine engine and the accessory gearbox 34 are drivingly coupled by an accessory gearbox shaft 38. The accessory gearbox 34 and transmission 36 are drivingly coupled by an intermediate shaft 40. The transmission 36 and compressor 32 are drivingly coupled by a compressor shaft 42. As will be appreciated, in other embodiments variations to the arrangement above are possible. It may be for instance that the accessory gearbox 34 could be omitted from the drive path and the intermediate shaft 40 drivingly coupling the transmission 36 directly to the shaft of the gas turbine engine.

The compressor 32 is disposed in a duct system 44 connecting a scoop (not shown) on an outer wall of a bypass duct (not shown) of the gas turbine engine and aircraft cabin air conditioning outlets (not shown). Alternatively the duct system 44 may be coupled to an air source within the core of the engine 10 instead of to the scoop, for example at the exit to a compressor 14 or part-way along a compressor 14 at an intermediate stage. Between the compressor 32 and air conditioning outlets in the duct system 44 is a starter air shut off valve 46. The shut-off valve 46 is arranged to be operable to alternatively allow one of two conditions. In a first condition the valve 46 permits the flow of air from the compressor 32 towards the air conditioning outlets and seals communication between the duct system 44 and a starter conduit (not shown). The starter conduit connects the duct system 44 at the location of the valve 46 and a port to atmosphere. In a second condition the valve 46 permits flow from the starter conduit towards the compressor 32 and prevents flow towards the air conditioning outlets.

Between the compressor 32 and the valve 46 is an array of variable exit guide vanes (not shown) disposed immediately adjacent the compressor 32.

The system 30 has both a forward and a reverse configuration which in use allow the system 30 to perform as a cabin blower or as part of a starter system for the gas turbine engine respectively.

In the forward configuration the compressor 32 is driven by the gas turbine engine shaft via the accessory gearbox shaft 38, the accessory gearbox 34, the intermediate shaft 40, the transmission 36 and the compressor shaft 42. The compressor 32, driven by the gas turbine engine shaft, compresses air collected by the scoop and delivered to the compressor via the duct system 44. This compressed air is conditioned by the variable exit guide vanes, positioned accordingly, to convert radial velocity kinetic energy of the air into higher static pressure, allowing it to be turned with less loss. The variability of the exit guide vanes means that a wider range of air flow rates, velocities and pressures can be effectively conditioned. Thereafter the air is delivered by the duct system 44 for regulated use in the cabin of the aircraft via the air conditioning outlets. The starter air shut-off valve 46 is placed in its first condition so as to permit flow towards the air conditioning outlets and to prevent losses to atmosphere via the starter conduit. The rate at which the compressor 32 is driven is controlled via the transmission 36, the gearing of which is controlled via a control signal 48 from a transmission controller (not shown).

In the reverse configuration the compressor 32 acts as a turbine and drives the gas turbine engine shaft via the compressor shaft 42, transmission 36, intermediate shaft 40, accessory gearbox 34 and accessory gearbox shaft 38. The compressor 32 is driven by gas (typically air) supplied from an external source via the starter conduit. With the valve 46 in its second condition gas supplied by the external source is supplied to the compressor 32 in order to drive it, while losses to the air conditioning outlets are prevented. The variable exit guide vanes, positioned accordingly, are used to direct the gas delivered via the starter conduit so as to encourage efficient driving of the compressor 32 in the opposite direction to its rotation when the system 30 is operating in the forward configuration. Furthermore the transmission 36 is adjusted so that despite the rotation of the compressor 32 in the opposite direction to that when the system 30 is operated in the first configuration, the drive direction delivered to the shaft of the gas turbine engine is common to the direction of rotation of the same shaft when the system 30 is operated in the first configuration.

Figure 3:
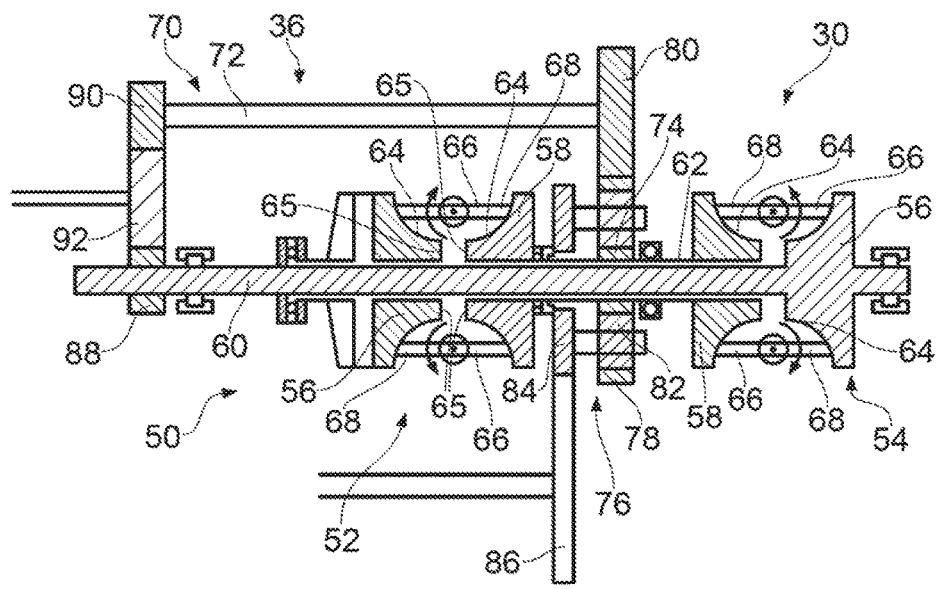
FIG. 3 is a cross-sectional view showing a transmission in accordance with an embodiment of the invention, the transmission being in a forward configuration.
Figure 4:
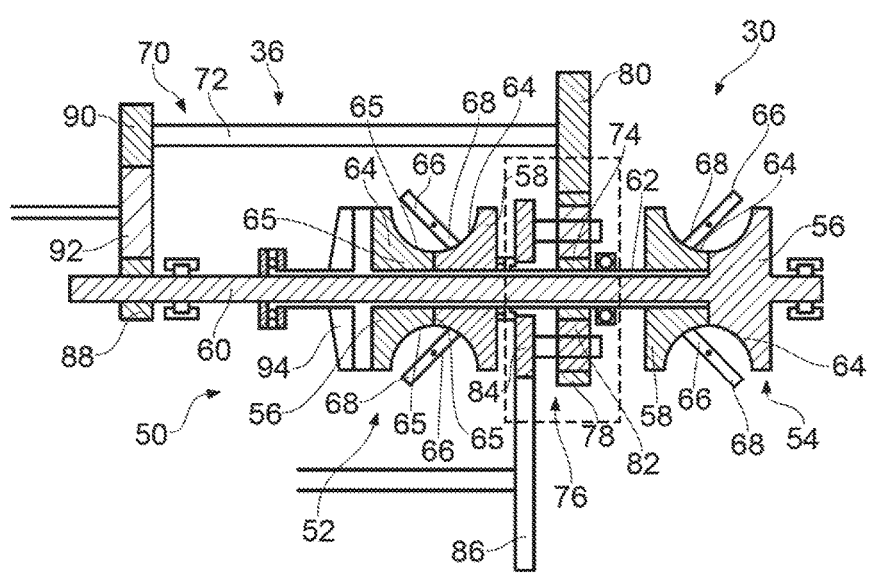
FIG. 4 is a cross-sectional view showing a transmission in accordance with an embodiment of the invention, the transmission being in a reverse configuration.

Referring now to FIGS. 3 and 4 the transmission 36 and in particular its first (FIG. 3) and second (FIG. 4) configurations are described in more detail.

The transmission 36 has a toroidal continuously variable transmission (CVT) generally provided at 50. The toroidal CVT 50 has first 52 and second 54 traction drives. Each traction drive 52, 54 has first 56 and second 58 toroids. The first toroid 56 of each traction drive 52, 54 is provided on and surrounds a first transmission shaft 60. The second toroid 58 of each traction drive 52, 54 is provided on surrounds a second transmission shaft 62. The first 60 and second 62 transmission shafts are coaxial and the first transmission shaft 60 passes through the second transmission shaft 62. The first transmission shaft 60 is longer than the second transmission shaft 62 in order to accommodate the first toroids 56 provided thereon.

The first 56 and second 58 toroids of each traction drive 52, 54 define a pair of opposed toroidal surfaces 64 and a pair of opposed parallel engagement surfaces 65. Disposed between the opposed toroidal surfaces 64 of each traction drive 52, 54 are a set of rotatable variators 66 (two per traction drive 52, 54 shown). Each variator 66 has a wheel 68 capable of simultaneously engaging and running on the opposed toroidal surfaces 64 of the respective traction drive 52, 54. Each variator 66 is also rotatable about an axis so as to vary the diameter at which the wheel 68 engages each of the opposed toroidal surfaces 64, increasing the diameter for one and reducing it for the other of the opposed toroidal surfaces 64. Each variator 66 is also rotatable to a degree such that the wheel 68 no longer engages one of the opposed toroidal surfaces 64.

The transmission 36 also has a bypass drive transmission 70 having a bypass transmission shaft 72. The bypass transmission shaft is non-coaxial with the first 60 and second 62 transmission shafts and is radially displaced therefrom. The bypass transmission shaft 72 is however parallel to the first 60 and second 62 transmission shafts.

Provided on the second transmission shaft 62 is a first gear of the transmission 74. The first gear 74 is a sun gear of a differential planetary gearbox 76. A ring gear 78 of the gearbox 76 is engaged with a second gear of the transmission 80 provided on the bypass transmission shaft 72. Between and engaged with the sun gear (first gear 74) and ring gear 78 are a plurality of planet gears 82 supported by a planet carrier gear 84. The planet carrier gear 84 is engaged with a compressor gear 86 of the compressor shaft 42. Consequently the planet carrier gear 84 is engaged with the compressor 36. As will be appreciated, in alternative embodiments the first gear 74, second gear 80 and compressor gear 86 may be or may be engaged with alternative of the gears of the differential planetary gearbox 76 mentioned. Indeed each possible combination is considered in order that increased design freedom is available in terms of selecting fundamental gear ratios.

A third gear of the transmission 88 is provided on the first transmission shaft 60 and a fourth gear of the transmission 90 is provided on the bypass transmission shaft 72. The third gear 88 and fourth gear 90 both engage a common gear 92 provided on the intermediate shaft 40. Both the first transmission shaft 60 and bypass transmission shaft 72 are therefore engaged to the shaft of the gas turbine engine.

Referring specifically now to FIG. 3, the transmission 36 is shown in the forward configuration. In the forward configuration the first 56 and second 58 toroids of each traction drive 52, 54 are axially separated and the wheels 68 of each variator 66 engage both respective opposed toroidal surfaces 64.

Consequently the opposed parallel engagement surfaces 65 are axially separated and therefore non-engaged. Power is delivered to the transmission 36 from the shaft of the gas turbine engine via the intermediate shaft 40 and common gear 92. This drives both the first transmission shaft 60 and bypass transmission shaft 72. The first transmission shaft 60 drives the second transmission shaft 62 via the first 56 and second 58 toroids and the variator wheels 68. The bypass transmission shaft 72 and second transmission shaft 62 provide input drive to the gearbox 76 in opposite directions.

Output from the gearbox 76 is via its planet carrier gear 84, via which drive is delivered to the compressor 32.

As will be appreciated the rate at which the planet carrier gear 84 spins and therefore the rate at which the compressor 32 is turned will depend on the relative input rates to the gearbox 76 from the bypass transmission shaft 72 and the second transmission shaft 62. These relative rotation rates will determine the combined drive rate outputted via the planet gears 82. Thus because the input from the second transmission 62 is variable in accordance with the rotational position of the variators 66, the rate at which the compressor 32 is spun is selectively variable. Control over the rotational position of the variators 66 is in accordance with signals 48 from the transmission controller (not shown). Specifically the signals will determine the position to which the variators 66 are rotated and therefore the diameter of the respective opposed toroidal surfaces 64 at which the wheels 68 engage. The rotation therefore allows adjustment to be made to the gearing between the toroids 56, 58. The signals sent by the transmission controller are in accordance with cabin air conditioning and pressurisation requirements. Because the toroidal CVT 50 is effectively used to modify the drive provided by the bypass drive transmission 70, power transmission may be more efficient than if power was transmitted exclusively via the toroidal CVT 50.

Referring specifically now to FIG. 4, the transmission 36 is shown in the reverse configuration. In the reverse configuration the first 56 and second 58 toroids of each traction drive 52, 54 are in direct engagement via their opposed parallel engagement surfaces 65. As will be appreciated the first 56 and second 58 toroids of each traction drive 52, 54 have been forced together by comparison with their position in the first configuration (FIG. 3). In order to achieve this the variators 66 are rotated so as their wheels 68 no longer engage the first toroid 56 in each traction drive 52, 54 and so as the rotation is sufficient such that the variators 66 would no longer impede the closing of the axial gap between the toroids 56, 58. Thereafter the toroids 56, 58 of each variator 66 are moved together and forced into a resilient engagement at their opposed parallel engagement surfaces 65 by an end load delivery system 94 comprising a hydraulically actuated piston. Power is delivered to the transmission 36 from the compressor 32 driven by an external source of gas and acting as a turbine. Power from the compressor 32 is delivered via the compressor shaft 42 and compressor gear 86 to the planet carrier gear 84 and into the gearbox 76. The gearbox 76 drives the second transmission shaft 62 and bypass transmission shaft 72. The second transmission shaft 62 drives the first transmission shaft 60 via the rotationally locked toroids 56, 58 of each traction drive 52, 54. The first transmission shaft 60 and bypass transmission shaft 72 drive the gear of the gas turbine engine via the common gear 92 and intermediate shaft 40. In this way the shaft of the gas turbine engine can be turned and air delivered to combustors before fuel is delivered and ignited.

As will be appreciated, after engine start, the system 30 can be returned to the forward configuration for delivering pressurised cabin air by driving the toroids 56, 58 apart using the end load delivery system 94. Thereafter the variators 66 are rotated so as the wheels 68 are orientated for engagement with both opposed toroidal surfaces 64 before the end load delivery system 94 drives the toroids 56, 58 towards each other until the wheels 68 engage both toroids. As will be appreciated, further temporary separation of the toroids 56, 58 by the end load delivery system 94 may be desirable and/or necessary before the variators 66 are re-oriented so as to be primed for engagement of the engagement surfaces 65 and operation of the system 30 in the reverse configuration.

Figure 5:
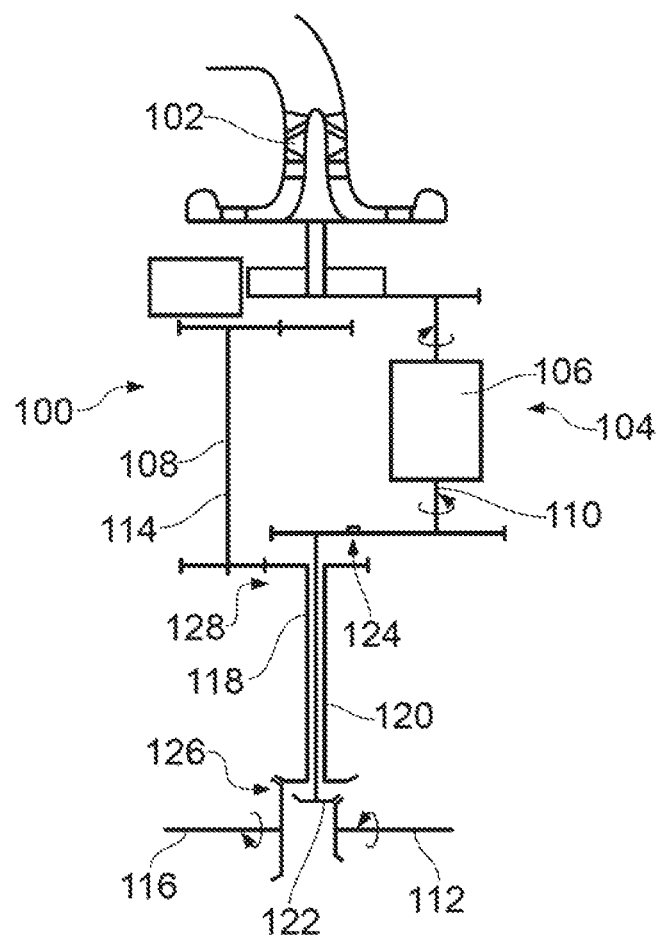
FIG. 5 is a schematic depiction of an aircraft cabin blower system in accordance with an embodiment of the invention.

Referring now to FIG. 5 an alternative cabin blower system is generally provided at 100. The cabin blower system 100 is similar to the cabin blower system 30 and has compressor 102 and a transmission 104 having a toroidal CVT 106 and a bypass drive transmission 108. The systems 30, 100 differ however in that in system 100 the toroidal CVT 106 and bypass drive transmission 108 are engaged with different shafts of the gas turbine engine. Specifically a first transmission shaft 110 of the toroidal CVT is engaged with a high pressure shaft 112 of the gas turbine engine and a bypass transmission shaft 114 is engaged with a low pressure shaft 116 of the gas turbine engine. Consequently, rather than a single intermediate shaft 40 provided with a common gear 92 engaging third 88 and fourth 90 gears of the transmission, a first 118 and second 120 intermediate shaft are provided.

The first intermediate shaft 118 is provided in a drive path between the first transmission shaft 110 and the high pressure shaft 112 of the gas turbine engine. A pair of engaged gears 122, one on the first intermediate shaft 118 and one on the high pressure shaft 112 are provided. Similarly a pair of engaged gears 124, one on the first intermediate shaft 118 and one on the first transmission shaft 110 are provided.

The second intermediate shaft 120 is provided in a drive path between the bypass transmission shaft 114 and the low pressure shaft 116 of the gas turbine engine. A pair of engaged gears 126, one on second intermediate shaft 120 and one on the low pressure shaft 114 are provided. Similarly a pair of engaged gears 128, one on the second intermediate shaft 120 and one on the bypass transmission shaft 114 are provided.

The first 118 and second 120 intermediate shafts are coaxial and rotate in a common direction. As will be appreciated the system 100 does not use an ancillary gearbox and ancillary gearbox shaft, in contrast to the system 30.

In operation of the system 100 in a forward configuration power is delivered to the compressor 102 from both the high 112 and low 116 pressure shafts of the gas turbine engine rather than just one shaft. Similarly, when the system is operated in a reverse configuration the compressor 102, acting as a turbine, delivers power to both the high 112 and low 116 pressure shafts of the gas turbine engine.

Figure 8:
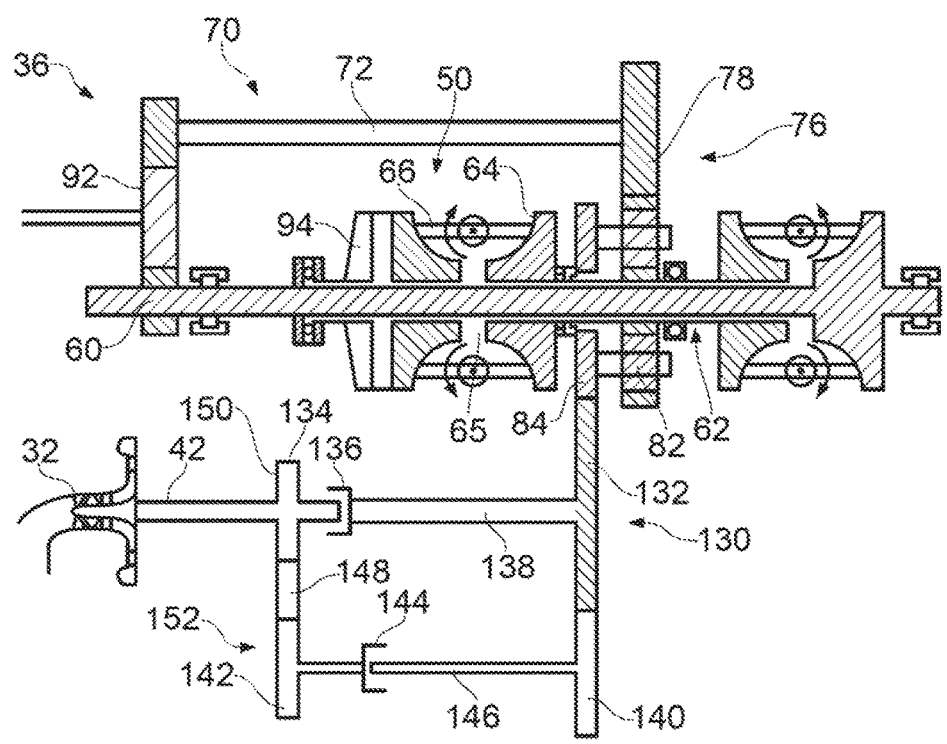
FIG. 8 is a cross-sectional view showing a transmission in accordance with an embodiment of the invention, the transmission being in a forward or reverse configuration.

Referring now to FIG. 8, a further optional feature is described. The transmission 36 is as described with respect to FIG. 3 except for the omission of the compressor gear 86. The cabin blower system 30 also includes a clutch arrangement 130. The clutch arrangement 130 includes a first drive transfer gear 132 which is coupled to or engaged with the planet carrier 84 of the toroidal continuously variable transmission 50. The first drive transfer gear 132 is thus driven by the combination of the toroidal continuously variable transmission 50 and the bypass transmission drive 70, whether driven by a single shaft through common gear 92 or by two separate shafts of the gas turbine engine 10.

The first drive transfer gear 132 is coupled to a compressor gear 134. The compressor gear 134 itself is coupled to or engaged with the compressor shaft 42 which rotates the compressor 32. There is a first clutch 136 situated between the first drive transfer gear 132 and the compressor gear 134, for example on the first drive transfer shaft 138 which extends from the first drive transfer gear 132 towards the compressor gear 134. The first clutch 136 may be any suitable clutch, such as mechanical or fluidic. In some embodiments the first clutch 136 may be an over-running clutch.

The first clutch 136 is arranged so that in the forward configuration the drive is transferred from the toroidal continuously variable transmission 50, and optionally from the bypass transmission drive 70, through the first drive transfer gear 132 and first drive transfer shaft 138 to the compressor gear 134 and thence to drive the compressor 32. Thus the first clutch 136 engages or couples together the first drive transfer gear 132 and the compressor gear 134 in the forward configuration.

In the reverse configuration the first clutch 136 is arranged to disengage the compressor gear 134 from the first drive transfer gear 132, for example by introducing a discontinuity in the first drive transfer shaft 138. In some embodiments the first clutch 136 may be an over-running clutch so that the two halves are mechanically disengaged in the reverse direction but are mechanically coupled in the forward direction. One half of the first clutch 136 is coupled to the compressor gear 134 while the other half of the first clutch 134 is coupled to the first drive transfer shaft 138 and thus to the first drive transfer gear 132. In other embodiments the first clutch 136 may be a fluidic clutch so that the two halves run independently with an air gap in the reverse configuration but are fluidically coupled in the forward configuration.

The first drive transfer gear 132, first clutch 136 and compressor gear 134 form a first gear train 150. The first gear train 150 includes the optional first drive transfer shaft 138 which links the first drive transfer gear 132 to the first clutch 136. Drive is transferred through the first gear train 150 in the forward configuration but is not transferred in the reverse configuration.

The clutch arrangement 130 also includes a second gear train 152. The second gear train 152 includes a second drive transfer gear 140, a second clutch 144 and a third drive transfer gear 142. The second drive transfer gear 140 may be coupled to the second clutch 144 via a second drive transfer shaft 146.

The second clutch 144 may be any suitable known clutch, such as a mechanical or fluidic clutch. In some embodiments it may have the same form as the first clutch 136. However, the second clutch 144 operates in the opposite sense to the first clutch 136. That is it mechanically or fluidically couples the third drive transfer gear 142 to the second drive transfer gear 140 in the reverse configuration and disengages them in the forward configuration. Thus drive is transferred through the second gear train 152 in the reverse configuration but is not transferred in the forward configuration.

The second gear train 152 also includes an idler gear 148. The idler gear 148 engages the third drive transfer gear 142 and the compressor gear 134 to drivingly couple them together. The second drive transfer gear 140 is engaged with or coupled to the first drive transfer gear 132.

In the forward configuration the drive is transferred from the planet carrier 84 of the toroidal continuously variable transmission 50 through the first gear train 150 to drive the compressor 32 to rotate in a first sense. In the reverse configuration the compressor 32, acting as a turbine, rotates in the opposite sense and so drives the compressor gear 134 to rotate in the opposite sense. The idler gear 148 causes the third drive transfer gear 142 to be rotated in the same sense as the compressor gear 134. The second clutch 144 couples the second drive transfer gear 140 to the third drive transfer gear 142 and so that also rotates in the same sense. The first drive transfer gear 132 is thus driven to rotate in the other sense, which is the same rotational direction as it was driven in the forward configuration. Thus the drive delivered to the differential planetary gearbox 76 through the planet carrier 84 is in the same rotational sense in the reverse configuration as it delivers in the forward configuration.

With the clutch arrangement 130 it is therefore not necessary to directly couple the first toroid 56 to the second toroid 58 or to move the variators 66 out of contact with at least one of the toroidal surfaces 64. Advantageously the variable gear ratio through the toroidal continuously variable transmission 50 achieved by the movement of the variators 66 on the toroidal surfaces 64 can be retained for the reverse configuration. The drive generated by the compressor 32 can be delivered to the gas turbine engine 10 via the toroidal continuously variable transmission 50 and the bypass transmission drive 70. The compressor 32 can be run at a constant speed, and therefore its operation be optimised, and the drive generated be scaled by the variable gear ratio of the toroidal continuously variable transmission 50.

The end load delivery system 94 may be omitted, since it is not necessary to axially move the first and/or second toroids 56, 58 towards each other. Nevertheless, it may be useful to maintain driving engagement between the first and second toroids 56, 58 via the end load delivery system 94.

The arrangement shown in FIG. 8 may be duplicated with each arrangement coupled between a shaft of the gas turbine engine 10 and a compressor 32. The two or more compressors 32 may be smaller than a single compressor 32 and together supply all the cabin blower requirements and all the required power for engine windmill re-light.

Figure 9:
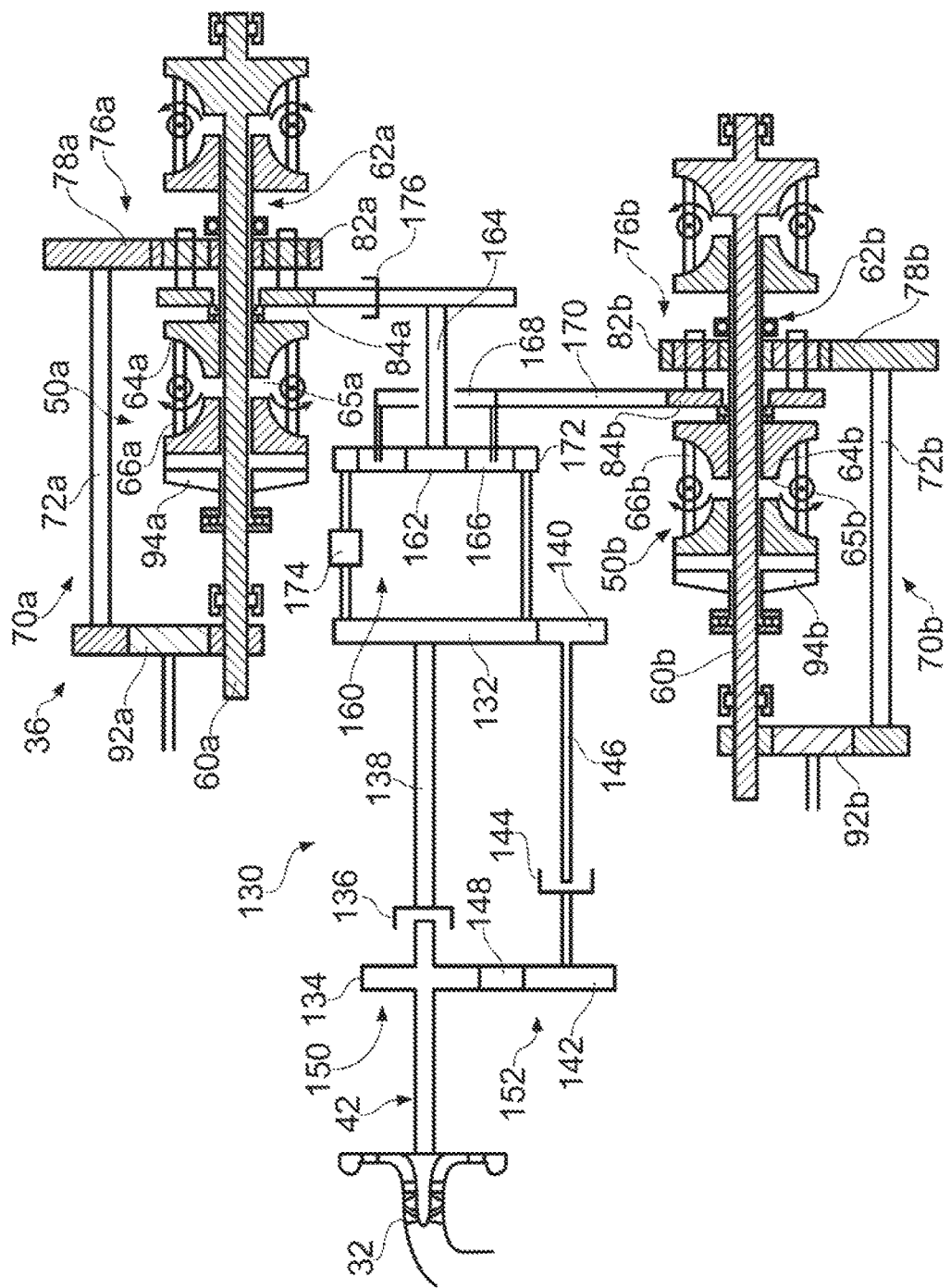
FIG. 9 is a cross-sectional view showing a transmission in accordance with an embodiment of the invention, the transmission being in a forward, reverse or windmill re-light configuration.

FIG. 9 shows another optional arrangement. The transmission 36 includes a first toroidal continuously variable transmission 50a and a second toroidal continuously variable transmission 50b. Each toroidal continuously variable transmission 50a, 50b may also include a bypass transmission drive 70a, 70b. The suffix 'a' is used to denote features of the first toroidal continuously variable transmission 50a and the first bypass drive transmission 70a. The suffix 'b' is used to denote features of the second toroidal continuously variable transmission 50b and the second bypass drive transmission 70b.

The first toroidal continuously variable transmission 50a, and its optional bypass transmission drive 70a, is coupled to one shaft of the gas turbine engine 10. The second toroidal continuously variable transmission 50b, and its optional second bypass drive transmission 70b, is coupled to another shaft of the gas turbine engine 10.

Between the first 50a and second 50b toroidal continuously variable transmissions is a second gearbox 160. The second gearbox 160 may be a differential planetary gearbox. The second gearbox 160 comprises a sun gear 162 which is coupled to the planet carrier 84a of the first toroidal continuously variable transmission 50a by a fourth drive transfer shaft 164. The fourth drive transfer shaft 164 includes suitable gears to engage with the planet carrier 84a. The second gearbox 160 also comprises a plurality of planet gears 166 which surround and engage with the sun gear 162. The planet gears 166 are ganged together by a planet carrier 168. The planet carrier 168 is coupled to the planet carrier 84b of the second toroidal continuously variable transmission 50b by a fifth drive transfer shaft 170, which includes suitable gears to engage with each planet carrier 84b, 138.

The second gearbox 160 also comprises a ring gear 172 which surrounds and engages with the planet gears 166. The ring gear 172 couples to the first drive transfer gear 132 of the first gear train 150 of the clutch arrangement 130. The first drive transfer gear 132 has suitable gears and shafts to couple with the ring gear 172. It may be integrally formed with the ring gear 172.

In the forward configuration drive is delivered to the transmission from two shafts of the gas turbine engine 10. For example drive is delivered to the first transmission shaft 60*a* of the first toroidal continuously variable transmission 50*a* from a low pressure or intermediate pressure shaft of the gas turbine engine 10. Optionally the drive is split and is also delivered to the first bypass transmission shaft 72*a*. In this case the drive is delivered via the common gear 92*a*. Where the bypass drive transmission 70*a* is omitted the drive is delivered directly to the first transmission shaft 60*a*. Drive is delivered to the first transmission shaft 60*b* of the second toroidal continuously variable transmission 50*b* from a high pressure shaft of the gas turbine engine 10. Optionally the drive is split and is also delivered to the second bypass transmission shaft 72*b*. In this case the drive is delivered via the common gear 92*b*. Where the bypass drive transmission 70*b* is omitted the drive is delivered directly to the first transmission shaft 60*b* of the second toroidal continuously variable transmission 50*b*.

The first differential planetary gearbox 76*a* delivers drive to the sun gear 162 of the second gearbox 160 via the fourth drive transfer shaft 164. The second differential planetary gearbox 76*b* delivers drive to the planet carrier 168 of the second gearbox 160 via the fifth drive transfer shaft 170. The drive is outputted from the ring gear 172 and delivered to the compressor 32 via the first gear train 150. The second clutch 144 is disengaged so that no drive is transferred between the second and third drive transfer gears 140, 142.

In the reverse configuration the compressor 32 acts as a turbine and thus rotates the compressor shaft 42 in the opposite sense. The drive is delivered through the second gear train 152 to the first drive transfer gear 132. The first clutch 136 is disengaged so no drive is transferred directly from the compressor gear 134 to the first drive transfer shaft 138. The drive is input to the second gearbox 160 via the ring gear 172 and is output to each of the first and second differential planetary gearboxes 76*a*, 76*b* via the sun gear 162 and planet carrier 168 respectively.

Due to the idler gear 148 in the second gear train 152 of the clutch arrangement 130, and the first and second clutch 136, 144 working in opposition to each other, the gears of the second gearbox 160 are rotated in the same sense in the reverse configuration as in the forward configuration. Thus the variators 66 remain in driving contact with their respective first and second toroids 56, 58 to provide a variable gear ratio between the first transmission shaft 60 and second transmission shaft 62 of the toroidal continuously variable transmission 50. Advantageously the compressor 32 may be operated, as a turbine, at an optimum, constant speed. The drive requirements of the shafts of the gas turbine engine 10 can be met by varying the gear ratios of the toroidal continuously variable transmissions 50.

Advantageously the second gearbox 160 enables the drive to be unequally split between the first and second toroidal continuously variable transmissions 50*a*, 50*b*. Thus the majority of the power to drive the compressor 32 may be provided from the high pressure shaft of the gas turbine engine 10 with a smaller amount of power supplied by the lower pressure shaft. Similarly in the reverse configuration the second gearbox 160 may supply the majority of the power generated by the compressor 32 to the high pressure shaft of the gas turbine engine 10, via the second toroidal continuously variable transmission 50*b*, and a smaller amount of power to the lower pressure shaft via the first toroidal continuously variable transmission 50*a*.

Advantageously, the arrangement shown in FIG. 9 can be used in a windmill re-light configuration. Windmill re-light is used to re-ignite a gas turbine engine 10 in which combustion has been extinguished but which is still rotating at appreciable speed. When combustion is extinguished the rotational speed of the gas turbine engine shafts quickly slows. One shaft, usually the high pressure shaft, is cranked to a higher speed whilst fuel is added to the combustor 16 to re-light the engine. Since the gas turbine engine shafts continue to rotate—to windmill—following flame extinction the amount of power required to maintain or somewhat accelerate the high pressure shaft for re-ignition is relatively low.

In the arrangement shown in FIG. 9, the low pressure or intermediate pressure shaft supplies the rotational drive to the high pressure shaft via the transmission 36. The first toroidal continuously variable transmission 50*a* acts in the forward configuration to receive power from the lower pressure shaft of the gas turbine engine 10 and deliver it, through the fourth drive transfer shaft 164, to the second gearbox 160. The second toroidal continuously variable transmission 50*b* acts in the reverse configuration to receive power from the second gearbox 160, via the fifth drive transfer shaft 170, and to deliver it to the high pressure shaft of the gas turbine engine 10.

The ring gear 172 further includes a brake 174. The brake 174 is arranged to prevent rotation of the ring gear 172 of the second gearbox 160, of the clutch arrangement 130 and of the compressor 32. Thus the second gearbox 160 functions in the planetary configuration (rather than as a differential) in which there is only one input shaft, the fourth drive transfer shaft 164 into the sun gear 162, and only one output shaft, the fifth drive transfer shaft 170 from the planet carrier 168. Advantageously the brake 174 ensures that all the power delivered to the first toroidal continuously variable transmission 50*a* is delivered, via the second gearbox 160 and second toroidal continuously variable transmission 50*b*, to the high pressure shaft of the gas turbine engine 10 and that none of the drive is diverted to the compressor 32.

The brake 174 may alternatively be replaced by the first and second clutches 136, 144 of the clutch arrangement 130. In this case both the first and second clutches 136, 144 act to disengage the compressor 32 from the second gearbox 160. In this case the ring gear 172 may also be braked by a separate brake mechanism or may continue to rotate as a driven idler gear without a load attached to it.

As will be apparent to the skilled reader, different gears of the second gearbox 160 may be coupled to the fourth drive transfer shaft 164, fifth drive transfer shaft 170 and first drive transfer gear 132. For example, the fifth drive transfer shaft 170 may be coupled to the ring gear 172 and the first drive transfer shaft 132 be coupled to the planet carrier 168. Thus the second gearbox 160 functions in the star configuration during windmill re-light.

Optionally there may be a third clutch 176 provided between the first toroidal continuously variable transmission 50*a* and the second gearbox 160. The third clutch 176 acts to disengage the first toroidal continuously variable transmission 50*a* from the gearbox 130, for example by disconnecting the fourth drive transfer shaft 164 from the planet carrier 84*a* or the sun gear 162. Thus when the third clutch 176 is arranged to disconnect the fourth drive transfer shaft 164 all the drive for the compressor 32 in the forward configuration is provided by the high pressure shaft of the gas turbine engine 10 via the second toroidal continuously variable transmission 50*b* and the fifth drive transfer shaft 170. Similarly in the reverse configuration all the power generated by the compressor 32 is directed to the high pressure shaft of the gas turbine engine 10 via the second gearbox 160 and second toroidal continuously variable transmission 50*b*.

The third clutch 176 may be any known form of clutch, including but not limited to mechanical and fluidic.

Figure 6:
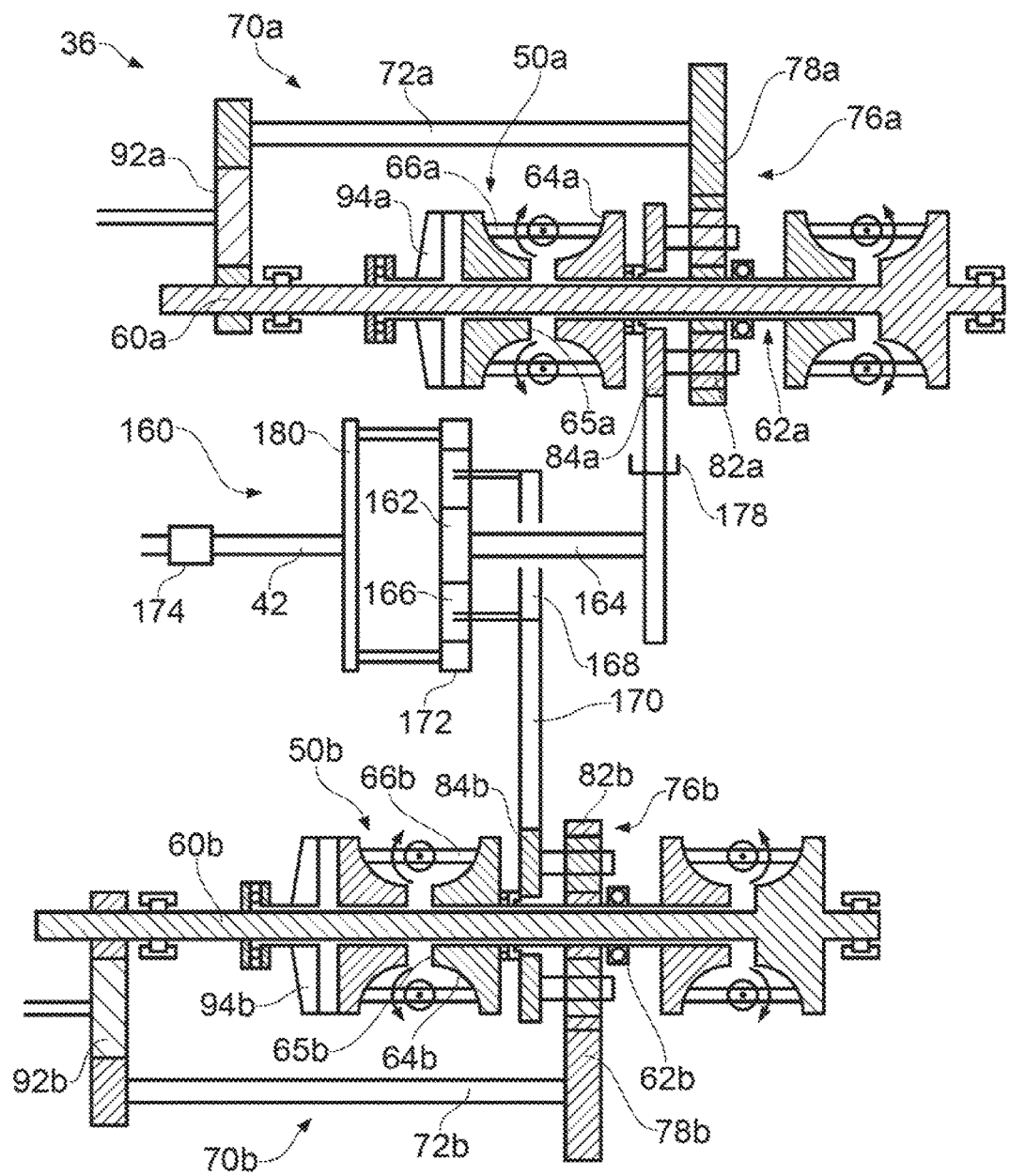
FIG. 6 is a cross-sectional view showing a transmission in accordance with an embodiment of the invention, the transmission being in a forward configuration.
Figure 7:
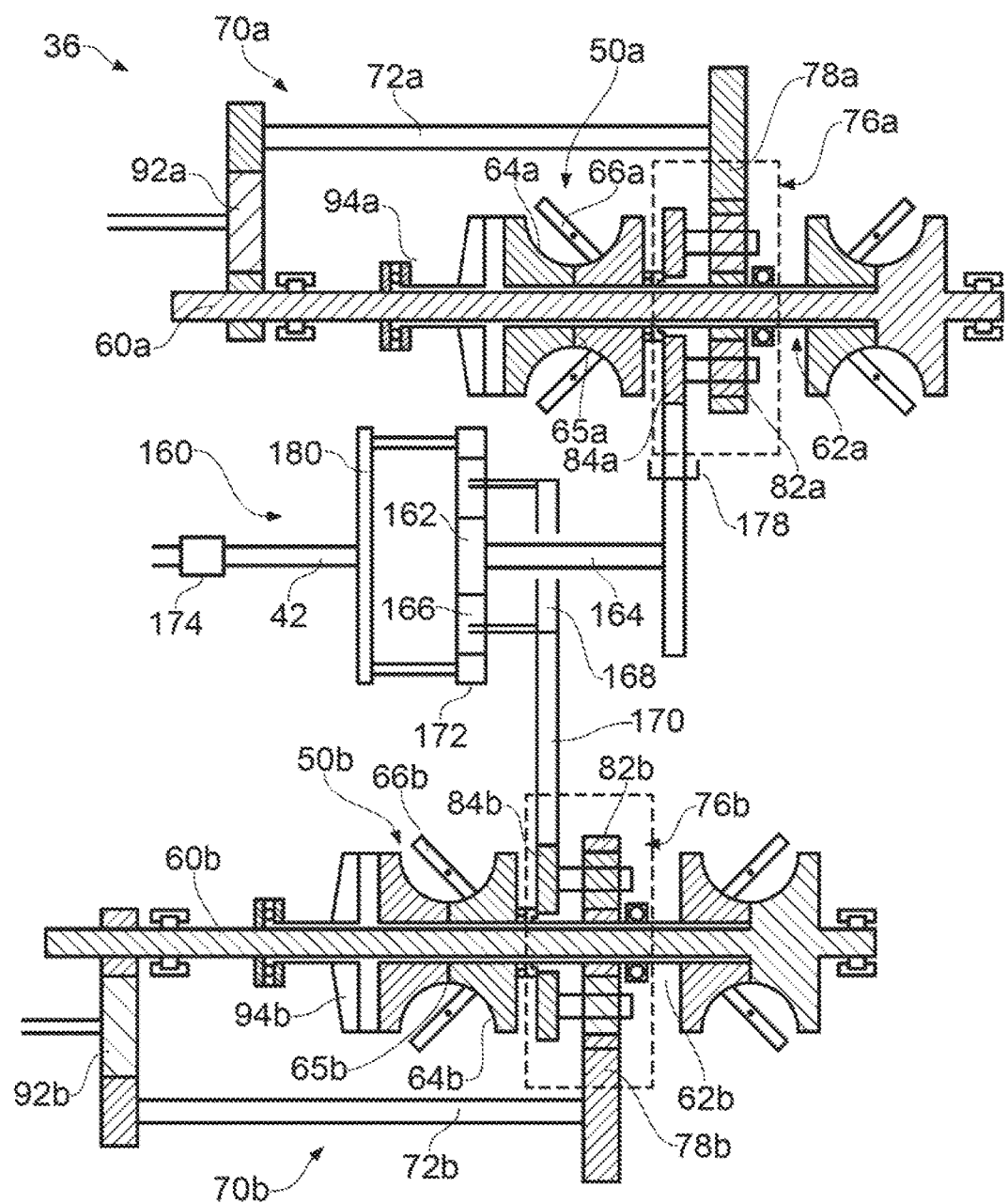
FIG. 7 is a cross-sectional view showing a transmission in accordance with an embodiment of the invention, the transmission being in a reverse configuration.

In either of the arrangements of FIGS. 6 and 7 the compressor 32 may be replaced by two or more smaller compressors 32 which receive or deliver drive in parallel.

Referring now to FIG. 6, a further optional arrangement of the cabin blower system 30 is described. The transmission 36 includes a first toroidal continuously variable transmission 50*a*. The first toroidal continuously variable transmission 50*a* is as described with respect to FIG. 3 except that the compressor gear 86 is omitted. Optionally the first bypass drive transmission 70*a* is also provided, as described with respect to FIG. 3. The suffix 'a' is used to denote features of the first toroidal continuously variable transmission 50*a* and the first bypass drive transmission 70*a*.

A second toroidal continuously variable transmission 50*b* is also provided, which is identical to the first toroidal continuously variable transmission 50*a*. Optionally a second bypass drive transmission 70*b* is also provided, which is identical to the first bypass drive transmission 70*a*.

Between the first 50*a* and second 50*b* toroidal continuously variable transmissions is a second gearbox 160. The second gearbox 160 may be a differential planetary gearbox. The second gearbox 160 comprises a sun gear 164 which is coupled to the planet carrier 84*a* of the first toroidal continuously variable transmission 50*a* by a fourth drive transfer shaft 164. The fourth drive transfer shaft 164 includes suitable gears to engage with the planet carrier 84*a*.

The second gearbox 160 also comprises a plurality of planet gears 166 which surround and engage with the sun gear 164. The planet gears 166 are ganged together by a planet carrier 168. The planet carrier 168 is coupled to the planet carrier 84*b* of the second toroidal continuously variable transmission 50*b* by a fifth drive transfer shaft 170, which includes suitable gears to engage with each planet carrier 84*b*, 138.

The second gearbox 160 also comprises a ring gear 172 which surrounds and engages with the planet gears 134. The ring gear 172 couples to the compressor shaft 42 via compressor gear 180. The compressor gear 180 has suitable gears and shafts to couple with the ring gear 172 and the compressor shaft 42. It may be integrally formed with either or both of the ring gear 172 and compressor shaft 42.

In the forward configuration drive is delivered to the transmission from two shafts of the gas turbine engine 10. For example drive is delivered to the first transmission shaft 60*a* of the first toroidal continuously variable transmission 50*a* from a low pressure or intermediate pressure shaft of the gas turbine engine 10. Optionally the drive is split and is also delivered to the first bypass transmission shaft 72*a*. In this case the drive is delivered via the common gear 90*a*. Where the bypass drive transmission 70*a* is omitted the drive is delivered directly to the first transmission shaft 60*a*. Drive is delivered to the first transmission shaft 60*b* of the second toroidal continuously variable transmission 50*b* from a high pressure shaft of the gas turbine engine 10. Optionally the drive is split and is also delivered to the second bypass transmission shaft 72*b*. In this case the drive is delivered via the common gear 90*b*. Where the bypass drive transmission 70*b* is omitted the drive is delivered directly to the first transmission shaft 60*b* of the second toroidal continuously variable transmission 50*b*.

The first differential planetary gearbox 76*a* delivers drive to the sun gear 164 of the second gearbox 160 via the fourth drive transfer shaft 164. The second differential planetary gearbox 76*b* delivers drive to the planet carrier 168 of the second gearbox 160 via the fifth drive transfer shaft 170. The drive is outputted from the ring gear 172 and delivered to the compressor 32 via the compressor gear 180 and compressor shaft 42.

In the reverse configuration the compressor 32 acts as a turbine and thus rotates the compressor shaft 42 in the opposite sense. The drive is input to the second gearbox 160 via the ring gear 172 and is output to each of the first and second differential planetary gearboxes 76*a*, 76*b* via the sun gear 164 and planet carrier 168 respectively.

The reverse configuration is shown in FIG. 7. As described with respect to FIG. 4, the variators 66 of each of the toroidal continuously variable transmissions 50*a*, 50*b* are rotated until they contact only one, or neither, of the toroidal surfaces 64 of the first and second toroids 56, 58. The end load delivery system 94 is applied to the first toroid 56*a*, 56*b* to move the toroids into driving engagement at their engagement surfaces 65*a*, 65*b*. Thus the rotation delivered to the first transmission shaft 60*a* of the first toroidal continuously variable transmission 50*a*, and optionally to the first bypass transmission shaft 72*a*, is in the same sense as in the forward configuration. The drive is therefore delivered to the shaft of the gas turbine engine 10 via the first transmission shaft 60*a* or the common gear 92*a*. Similarly, the rotation delivered to the first transmission shaft 60*b* of the second toroidal continuously variable transmission 50*b*, and optionally to the second bypass transmission shaft 72*b*, is in the same sense as in the forward configuration. The drive is therefore delivered to the shaft of the gas turbine engine 10 via the first transmission shaft 60*b* or the common gear 92*b*.

Advantageously the second gearbox 160 enables the drive to be unequally split between the first and second toroidal continuously variable transmissions 50*a*, 50*b*. Thus the majority of the power to drive the compressor 32 may be provided from the high pressure shaft of the gas turbine engine 10 with a smaller amount of power supplied by the lower pressure shaft. Similarly in the reverse configuration the second gearbox 160 may supply the majority of the power generated by the compressor 32 to the high pressure shaft of the gas turbine engine 10, via the second toroidal continuously variable transmission 50*b*, and a smaller amount of power to the lower pressure shaft via the first toroidal continuously variable transmission 50*a*.

In either of the arrangements of FIGS. 6 and 7 the compressor 32 may be replaced by two or more smaller compressors 32 which receive or deliver drive in parallel.

Advantageously, the arrangement shown in FIG. 6 and FIG. 7 can be used in a windmill re-light configuration. Windmill re-light is used to re-ignite a gas turbine engine 10 in which combustion has been extinguished but which is still rotating at appreciable speed. When combustion is extinguished the rotational speed of the gas turbine engine shafts quickly slows. One shaft, usually the high pressure shaft, is cranked to a higher speed whilst fuel is added to the combustor 16 to re-light the engine. Since the gas turbine engine shafts continue to rotate—to windmill—following flame extinction the amount of power required to maintain or somewhat accelerate the high pressure shaft for re-ignition is relatively low.

In the arrangement shown in FIGS. 6 and 7, the low pressure or intermediate pressure shaft supplies the rotational drive to the high pressure shaft via the transmission 36. The first toroidal continuously variable transmission 50a acts in the forward configuration to receive power from the lower pressure shaft of the gas turbine engine 10 and deliver it, through the fourth drive transfer shaft 164, to the second gearbox 160. The second toroidal continuously variable transmission 50b acts in the reverse configuration to receive power from the second gearbox 160, via the fifth drive transfer shaft 170, and to deliver it to the high pressure shaft of the gas turbine engine 10.

The compressor shaft 42 or compressor gear 144 further includes a brake 174. The brake 174 is arranged to prevent rotation of the compressor 32 and the ring gear 172 of the second gearbox 160. Thus the second gearbox 160 functions in the planetary configuration (rather than as a differential) in which there is only one input shaft, the fourth drive transfer shaft 164 into the sun gear 164, and only one output shaft, the fifth drive transfer shaft 170 from the planet carrier 168. Advantageously the brake 174 ensures that all the power delivered to the first toroidal continuously variable transmission 50a is delivered, via the second gearbox 160 and second toroidal continuously variable transmission 50b, to the high pressure shaft of the gas turbine engine 10 and that none of the drive is diverted to the compressor 32.

The brake 174 may alternatively be a clutch which acts to disengage the compressor 32 from the second gearbox 160. In this case the ring gear 172 may be braked by a separate brake mechanism or may continue to rotate as a driven idler gear without a load attached to it.

As will be apparent to the skilled reader, different gears of the second gearbox 160 may be coupled to the fourth drive transfer shaft 164, fifth drive transfer shaft 170 and compressor shaft 42. For example, the fifth drive transfer shaft 170 may be coupled to the ring gear 172 and the compressor shaft 42 be coupled, via the compressor gear 144, to the planet carrier 168. Thus the second gearbox 160 functions in the star configuration during windmill re-light.

Optionally there may be a third clutch 176 provided between the first toroidal continuously variable transmission 50a and the second gearbox 160. The third clutch 176 acts to disengage the first toroidal continuously variable transmission 50a from the gearbox 130, for example by disconnecting the fourth drive transfer shaft 164 from the planet carrier 84a or the sun gear 164. Thus when the third clutch 176 is arranged to disconnect the fourth drive transfer shaft 164 all the drive for the compressor 32 in the forward configuration is provided by the high pressure shaft of the gas turbine engine 10 via the second toroidal continuously variable transmission 50b and the fifth drive transfer shaft 170. Similarly in the reverse configuration all the power generated by the compressor 32 is directed to the high pressure shaft of the gas turbine engine 10 via the second gearbox 160 and second toroidal continuously variable transmission 50b.

The third clutch 176 may be any known form of clutch, including but not limited to mechanical and fluidic.

Figure 10:
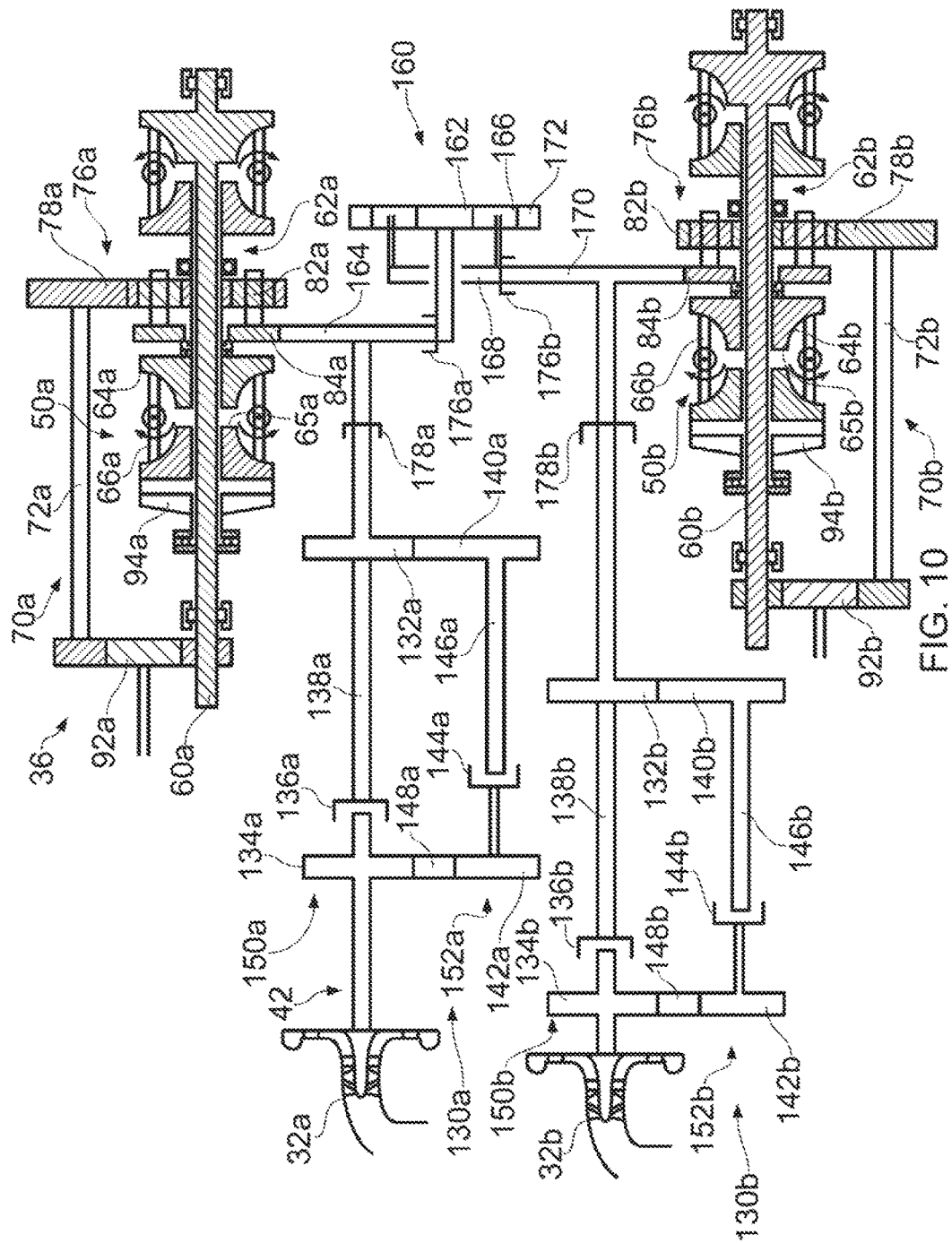
FIG. 10 is a cross-sectional view showing a transmission in accordance with an embodiment of the invention, the transmission being in a forward, reverse or windmill re-light configuration.

FIG. 10 shows a further optional combination. Two separate transmissions 36 are shown, each as described with respect to FIG. 3. A first compressor 32a is driven by the first toroidal continuously variable transmission 50a via first clutch arrangement 130a. A second compressor 32b is driven by the second toroidal continuously variable transmission 50b via second clutch arrangement 130b. Each of the compressors 32a, 32b may be smaller than a single compressor 32 so that the first and second compressors 32a, 32b together meet the maximum cabin air blower demand. The compressors 32a, 32b may be the same size or may be unequally sized.

A second gearbox 160 may be provided between the planet carrier 84a of the first toroidal continuously variable transmission 50a and the planet carrier 84b of the second toroidal continuously variable transmission 50b. The second gearbox 160 enables drive from one toroidal continuously variable transmission 50a, 50b to be transferred to the other toroidal continuously variable transmission 50b, 50a. The second gearbox 160 may be coupled to each planet carrier 84a, 84b via the fourth and fifth drive transfer shafts 164, 170. For example, the first planet carrier 84a may be coupled to the sun gear 162 of the second gearbox 160 and the second planet carrier 84b may be coupled to the planet carrier 168 of the second gearbox 160.

A third clutch 176a may be positioned between the fourth drive transfer shaft 164 and the sun gear 162 of the second gearbox 160. The third clutch 176a acts to disengage the first toroidal continuously variable transmission 50a and first compressor 32a from the second gearbox 160 during the forward and reverse configurations. The third clutch 176a acts to engage the fourth drive transfer shaft 164 and the second gearbox 160 in the windmill re-light configuration. There may also be a fourth clutch 178a between the clutch arrangement 130a of the first compressor 32a and the fourth drive transfer shaft 164 which operates in the windmill re-light configuration to disengage the first compressor 32a as a load or power generator.

Similarly, a third clutch 176b may be positioned between the fifth drive transfer shaft 170 and the planet carrier 168 of the second gearbox 160. The third clutch 176b acts to disengage the second toroidal continuously variable transmission 50b and second compressor 32b from the second gearbox 160 during the forward and reverse configurations. The third clutch 176b acts to engage the fifth drive transfer shaft 170 and the second gearbox 160 in the windmill re-light configuration. There may also be a fourth clutch 178b between the clutch arrangement 130b of the second compressor 32b and the fifth drive transfer shaft 170 which operates in the windmill re-light configuration to disengage the second compressor 32b as a load or power generator.

The lower pressure shaft can be used to start the high pressure shaft of the gas turbine engine 10 using the windmill re-light configuration. Thus the fourth clutches 178a, 178b act to disengage both of the first and second compressors 32a, 32b from the fourth and fifth drive transfer shafts 164, 170 respectively. The third clutches 176a, 176b act to couple the first toroidal continuously variable transmission 50a to the second toroidal continuously variable transmission 50b through the second gearbox 160.

Alternatively the functionality of the fourth clutch 178a can be performed by the clutch arrangement. 130a. Thus the first and second clutches 136, 144 can be disengaged so that drive is not transferred to or from the first compressor 32a in the windmill re-light configuration. Similarly the fourth clutch 178b can be replaced by the clutch arrangement 130b.

It will be understood that the first compressor 32a may be used to start a lower pressure shaft of the gas turbine engine 10 in the reverse configuration by using the third clutch 176a to disengage the second gearbox 160. Alternatively the second compressor 32b may be use to start the high pressure shaft of the gas turbine engine 10 in the reverse configuration by using the third clutch 176b to disengage the second gearbox 160.

Where only one of the first and second compressors 32a, 32b is required to meet the cabin air blower demand the other compressor 32a, 32b can be disengaged from its toroidal continuously variable transmission 50a, 50b by use of the clutches. The first and second compressors 32a, 32b may also both be driven from the same toroidal continuously variable transmission 50a, 50b if a further clutch is provided. For example one of the clutch arrangements 130a, 130b can be used as the further clutch. Thus the first and second systems are independent of each other. They can be used in concert to meet a higher load demand. The systems can be coupled in the windmill re-light configuration.

It will be understood that the invention is not limited to the embodiments above-described and various modifications and improvements can be made without departing from the various concepts described herein. Except where mutually exclusive, any of the features may be employed separately or in combination with any other features and the invention extends to and includes all combinations and sub-combinations of one or more features described herein in any form of cabin blower system.

The invention claimed is:

1. An aircraft blower system comprising:
 a transmission including (i) at least two traction drives, and (ii) a planetary gearbox disposed between the at least two two traction drives and mechanically coupled to each of the at least two two traction drives; and
 a compressor mechanically coupled to the planetary gearbox, the aircraft blower system having a forward configuration in which the compressor is configured to be driven by a gas turbine engine via the transmission, the transmission including a first toroidal continuously variable transmission providing control over a selectively variable rate at which the compressor is driven;
 wherein the aircraft cabin blower system is configured to operate in a reverse configuration including a supply of pressurised gas being supplied to the compressor, and the compressor acting as a turbine and driving one or more shafts of the gas turbine engine via the transmission.

2. The aircraft cabin blower system according to claim 1, wherein drive for the aircraft cabin blower system in the forward configuration is generated by the gas turbine engine and is delivered to the transmission via the one or more shafts of the gas turbine engine.

3. The aircraft cabin blower system according to claim 1, wherein drive is transmitted through the at least two traction drives, the at least two traction drives each including a first toroid attached to a first transmission shaft and a second toroid attached to a second transmission shaft, each one of the first and second toroids having one of a pair of opposed toroidal surfaces, and a set of rotatable variators being disposed between the opposed toroidal surfaces.

4. The aircraft cabin blower system according to claim 3, wherein, in the forward configuration of the aircraft cabin blower system, the respective first and second toroids are separated and are drivingly engaged via a wheel of each rotatable variator of the respective sets of rotatable variators, each wheel being configured to run on both of the respective opposed toroidal surfaces.

5. The aircraft cabin blower system according to claim 3, wherein in the reverse configuration, each respective set of rotatable variators are orientated so that a respective wheel of each rotatable variator of each set of rotatable variators engages no more than one respective opposed toroidal surface, and the respective first toroid and a second toroid are positioned to create a driving engagement via direct engagement between a respective engagement surface of each one of the respective first and second toroids.

6. The aircraft cabin blower system according to claim 1, wherein the transmission further includes a bypass drive transmission parallel to the toroidal continuously variable transmission, the bypass drive transmission including a bypass transmission shaft.

7. The aircraft cabin blower system according to claim 6, wherein a first transmission shaft of the toroidal continuously variable transmission is engaged with a first shaft of the one or more shafts of the gas turbine engine and the bypass transmission shaft of the bypass drive transmission is engaged with a second shaft of the one or more shafts of the gas turbine engine.

8. The aircraft cabin blower system according to claim 6, wherein the toroidal continuously variable transmission and the bypass drive transmission are engaged with a common shaft of the one or more shafts of the gas turbine engine.

9. The aircraft cabin blower system according to claim 1, further comprising a clutch arrangement between the transmission and the compressor.

10. The aircraft cabin blower system according to claim 9, wherein:
 the clutch arrangement includes:
  a first gear train having (i) a first drive transfer gear, (ii) a compressor gear, and (iii) a first clutch, the first gear train being configured to transfer drive from the transmission to the compressor when the system is operated in the forward configuration; and
  a second gear train having (i) a second drive transfer gear, (ii) a third drive transfer gear, and (iii) a second clutch, the second gear train being configured to transfer drive from the compressor to the transmission when the system is operated in the reverse configuration.

11. The aircraft blower system according to claim 10, wherein the first clutch and second clutch act in opposition to direct drive through only one of the first gear train and second gear train.

12. The aircraft cabin blower system according to claim 1, wherein the transmission includes a second toroidal continuously variable transmission, the first toroidal continuously variable transmission and the second toroidal continuously variable transmission forming parallel transmission paths.

13. The aircraft cabin blower system according to claim 12, wherein:
 the system is configured to be operable in a windmill re-light configuration, wherein the first toroidal continuously variable transmission is driven by a first shaft of the one or more shafts of the gas turbine engine; and
 the second toroidal continuously variable transmission is driven by the first toroidal continuously variable transmission, and the second toroidal continuously variable transmission drives a second shaft of the one or more shafts of the gas turbine engine.

* * * * *